United States Patent Office 3,547,899
Patented Dec. 15, 1970

3,547,899
POLYMERS CONTAINING SULPHONIC ACID GROUPS
Dieter Arlt, Cologne-Buchheim, Dietrich Glabisch, Opladen, and Carlhans Suling, Leverkusen, Germany, assignors to Farbenfabriken Bayer Aktiengesellschaft, Leverkusen, Germany, a corporation of Germany
No Drawing. Continuation of application Ser. No. 665,233, Sept. 5, 1967. This application July 23, 1969, Ser. No. 849,562
Claims priority, application Germany, Sept. 16, 1966, F 50,212
Int. Cl. C07c 97/16
U.S. Cl. 260—79.3                                4 Claims

ABSTRACT OF THE DISCLOSURE

This invention relates to polymers containing 2-acryloyl-amino-2,2-dimethylethane-1-sulphonic acid or the corresponding methacryloyl compound in polymerised or copolymerised form, preparation thereof by free radical polymerization methods and the utility thereof for the preparation of films and fibers.

---

This application is a continuation of application Ser. No. 665,233 filed Sept. 5, 1967, and now abandoned.

It is known that acid modified polymers can be produced by polymerising and copolymerising monomers containing sulphonic acid groups. For example, the use of vinyl sulphonic acid as a monomer containing sulphonic acid groups has already been described. One disadvantage affecting the polymerisation of this monomer is its unfavourable reactivity so that this compound can only be polymerised under specific conditions and in specific ratios with a number of comonomers, for example, with acrylonitrile. It is also known that allyl sulphonic acid or methallyl sulphonic acid may be used as a comonomer in the systhesis of polymer containing sulphonic acid groups. Unfortunately, monomers of this kind show only a very limited tendency to form copolymers with vinyl or vinylidene compounds.

It is also known that salts of 2-acryloylaminoethane-1-sulphonic acid and salts of 2-acryloylaminoethane-1-sulphonic acid substituted by alkyl radicals on the amino nitrogen may be used as comonomers in the synthesis of polymers and copolymers containing sulphonic acid groups. One disadvantage of these comonomers is that the sulphonic acid group is attached to the polymer chains through a functional group which is sensitive to hydrolysis.

It has now been found that polymers containing sulphonic acid groups which are resistant to hydrolysis can be obtained by polymerising 2-acryloylamino-2,2-dimethylethane-1-sulphonic acid or the corresponding methacryloyl compound in the presence of a polymerisation catalyst and optionally in the presence of at least one vinyl or vinylidene compounds. The monomers used in accordance with the invention correspond to the general formula:

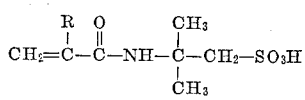

in which R represents hydrogen or methyl. These compounds may be obtained generally speaking by reacting acrylonitrile or methacrylonitrile with sulphur trioxide or chlorosulphonic acid and isobutylene. A detailed description of the preparation of these monomers is contained in Belgian Pat. No. 685,152.

In these compounds, the sulphonic acid group is attached to the acrylamide radical by way of an isobutylene function. This group is not sensitive to hydrolysis. Surprisingly, the activity of the compound is so similar to the polymerisation properties of vinyl and vinylidene monomers that copolymers uniform in composition are easy to produce.

Another advantage of using the comonomers according to the invention in preference to conventional comonomers is that these monomers may be used as free sulphonic acids in the polymerisation reactions, whereas in the past it was necessary almost without exception to use salts of sulphonic acids which in many cases were still inevitably contaminated with electrolytes, for example, NaCl, from the manufacturing process.

Polymerisation and copolymerisation may be carried out under a variety of known conditions in the presence of a variety of radical-forming initiators and initiator systems. It is possible to carry out polymerisation in solution, emulsion or dispersion. Preferred embodiments of the copolymerisation reaction will always be governed by the type of monomer mixture to be used. The polymerisation processes itself are known. For copolymerisation, the monomers according to the invention may be used in varying quantities according to the desired use of the polymers. If, for example, the copolymers are used to modify hydrophobic polymers, small quantities only of acid groups are required in the polymer. Quantities as small as 0.5% to 2.5% by weight of the monomers according to the invention are sufficient to produce outstanding effects. The copolymers should contain 0.5 to 10% by weight, preferably 1 to 8% by weight of the stated monomers containing a sulphonic acid group.

Suitable initators include peroxidic compounds capable of forming radicals, such as hydrogen peroxide, di-tert.-butyl peroxide, benzoyl peroxide, lauroyl peroxide and cumene hydroperoxide. Polymerisation may even be initiated with aliphatic azo compounds. The initators should be used in amounts of 0.01 to 5%, preferably 0.08 to 2% by weight, based on the monomers used.

Suitable comonomers include the conventional vinyl or vinylidene compounds and divinyl compounds such as, for example, ethylene, vinyl acetate, vinyl chloride, vinylidene chloride, styrene, maleic anhydride, acrylic acid, methacrylic acid, acrylates and methacrylates having 1 to 18, preferably 1 to 4 carbon atoms in the alcohol moiety, acrylamide and methacrylamide, (meth)acrylmethylamide, (meth)acryldimethylamide, (meth)acrylhydroxyethylamide, butadiene, chlorobutadiene and isoprene. Methacrylonitrile and acrylonitrile are also suitable.

The polymerisation may be carried out at temperatures between about —15 and +200° C., preferably between 50 and 180° C.

The polymerisation is normally carried out at atmospheric pressure but in special cases it is possible to polymerise at pressures between about 10 to 2000, preferably between 50 to 500 atmospheres excess pressure, for example, if ethylene is copolymerised.

Copolymers which consist mainly of acrylonitrile, for example, and which contain the comonomers according to the invention in quantities of 0.5 to 8%, and preferably in quantities of from 1% to 4%, are obtained, for example, by precipitation polymerisation. In one particular embodiment, the precipitation polymerisation reaction is activated by Redox systems in aqueous dispersion at pH-values below 6, particularly valuable polymers being obtained in cases in which sulphates or chlorates are used as oxidation components and compounds of tetravalent sulphur are used as reducing components of Redox systems.

In cases in which copolymerisation is carried out with acrylonitrile and vinylidene chloride, it is best to work in a mixture of water and water miscible organic solvents such as aliphatic alcohols with from 1 to 3 carbon atoms, acetic acid and acetone.

Polymerisation may, of course, also be carried out in solvents such as dimethyl formamide or dimethyl sulphoxide.

Conventional emulsifiers, for example, the alkali metal salts of fatty acids or the soluble salts of long-chain sulphonic acid, are used in cases in which the monomers according to the invention are polymerised in emulsion. The emulsifying salts of quaternary ammonium compounds containing a long chain alkyl radical in the ammonium radical may also be used as emulsifiers. It is also possible to use non-ionic emulsifiers, such as polyalkylene oxides, for the emulsion polymerisation reaction. It was surprising that the water-soluble monomers according to the invention could be used as effective comonomers in the emulsion polymerisation reaction because, in this type of polymerisation process, the development or growth reaction takes place in the organic phase, although it is generally known that sulphonic acids and the salts of sulphonic acids are almost insoluble in hydrocarbons such as styrene or butadiene, in alkyl halides such as vinyl chloride and in carboxylic acid esters such as methyl methacrylate.

The polymers of the invention may be used for producing films and fibres showing a high degree of whiteness and an outstanding affinity for basic dyes.

PREPARATION OF A MONOMER 53 g. (1 mol) acrylonitrile are dissolved in 300 ml. liquid sulphur dioxide. 80 g. (1 mol) sulphur trioxide are added dropwise to this solution at −40° C. while stirring. 50 l. gaseous isobutylene are introduced into the stirred mixture at −40° to −30° C. within 3 hours. 20 g. (1.1 mol) water are then added. When the solution is concentrated, a slurry-like precipitate is formed which is filtered off with suction. 150 g. (0.73 mol) N-acrylo-2-amino-2-methyl-propane-sulphonic acid-(1) are obtained. After recrystallisation from glacial acetic acid, the compound melts at 186–187° C. with decomposition.

Example 1

10 g. of 2 - acryloylamino - 2,2 - dimethylethane-1-sulphonic acid are dissolved in 50 g. of desalted water, and the resulting solution is polymerised for 4 hours at 60° C. in the presence of 0.1 g. of potassium persulphate and 0.1 g. of sodium pyrosulphite. Following dialysis, a viscous clear polymer solution is obtained. Polymerisation gives a conversion of more than 70%.

About the same result is obtained, if 2-methacryloyl-amino - 2,2 - dimethylethane - 1 - sulphonic acid is homopolymerised.

Example 2

100 parts by weight of desalted water and 0.2 part by weight of n-sulphuric acid are introduced into a polymerisation vessel. The following 3 solutions are then uniformly added to the resulting mixture over a period of 3 hours at 50° C. after the atmospheric oxygen has been displaced from the polymerisation vessel with nitrogen:

Solution 1: Parts by weight
  Potassium persulphate _____ 0.4
  Desalted water _____ 300
  Sulphuric acid _____ 0.7
Solution 2:
  Sodium pyrosulphite _____ 1.2
  Water _____ 300
  2-acryloylamino-2,2-dimethylethane-1-sulphonic acid _____ 1.0
Solution 3:
  Acrylonitrile _____ 95
  Methyl acrylate _____ 4

After 5 to 10 minutes, the reaction solution clouds, a fine-grained white deposit being precipitated. Following separation of the polymer by suction-filtration and drying in a cabinet at 50° C., a pure white polymer with a K-value of 90 is obtained in a yield of more than 80%. Films and fibres showing a high degree of whiteness and an outstanding affinity for basic dyes can be produced from this polymer.

If 2-methacryloyl-amino-2,2-ethane-1-sulphonic acid is used in solution 2 instead of the acryl compound an analogue result is obtained.

Example 3

1000 parts by weight of desalted water, 400 parts by weight of tert.-butanol, 20 parts by weight of n-phosphoric acid and 0.25 part by weight of potassium persulphate are introduced into a polymerisation vessel. A mixture of 1,230 parts by weight of acrylonitrile, 750 parts by weight of vinylidene chloride and 20 parts by weight of 2-acryloylamino - 2,2 - dimethylethane - 1 - sulphonic acid is polymerised over a period of 3 hours by combining the monomers with 4,000 parts by weight of 0.115% by weight potassium persulphate solution and 4000 parts by weight of a 0.625% by weight sodium pyrosulphite solution. The polymer thus formed is filtered off and dries. The yield is 82% by weight. The product has a K-value of 80, as measured in dimethyl formamide. The polymer is an eminently suitable starting material for synthetic fibres.

Example 4

12 parts by weight of potassium persulphate, 10 parts by weight of $K_2HPO_4$, 25 parts by weight of 2-acryloylamino-2,2-dimethylethane-1-sulphonic acid and 1,475 parts by weight of distillated boiled out water are introduced in an autoclave. The atmospheric oxygen is removed by triple rinsing with about 20 atmospheres excess pressure of ethylene. After that 220 parts by weight of vinyl chloride are added. The autoclave is heated to 70° C. and 200 atmospheres excess pressure of ethylene are pumped in. After 1, 3 and 5 hours always 110 parts by weight of vinyl chloride are added and the pressure of 170 to 200 atmospheres excess pressure is maintained by repressing ethylene. After 18 hours the polymerisation is stopped. 1,929 parts by weight of a 24.1% by weight aqueous stable emulsion is obtained. The copolymers contain 64.1% by weight of copolymerised vinyl chloride. After drying process the emulsion forms elastic lacquer films.

The same result is obtained if the corresponding 2-methacryloyl-2,2-dimethylethane-sulphonic acid is copolymerised.

What is claimed is:
1. A normally solid homopolymer consisting of polymerized units of 2-acryloylamino-2,2-dimethylethane-1-sulphonic acid or 2-methacryloylamino-2,2-dimethylethane-1-sulphonic acid.
2. A normally solid copolymer containing as free radical copolymerized monomers (a) 0.5 to 10% by weight of 2-acryloylamino-2,2-dimethylethane-sulphonic acid or the corresponding methacrylic compound and (b) 99.5 to 90% by weight of at least one monomer selected from the group consisting of ethylene, vinyl acetate, vinyl chloride, vinylidene chloride, styrene, acrylic acid, methacrylic acid, acrylonitrile, methacrylonitrile, methacrylic and acrylic acid esters having 1 to 18 carbon atoms in the alcohol moiety, acrylamide, methacrylamide, acrylmethylamide, methacrylmethylamide, acryldimethylamide, methacryldimethylamide, acrylhydroxyethylamide, methacrylhydroxyethylamide, butadiene, chlorobutadiene and isoprene.

3. The copolymer of claim 2 wherein said monomer (b) is acrylonitrile.

4. The copolymer of claim 2 wherein said monomer (b) is vinyl chloride.

References Cited

UNITED STATES PATENTS 2,983,712  5/1961  Wilkinson _____ 260—79.3

FOREIGN PATENTS 704,373  2/1965  Canada _____ 260—79.3

JAMES A. SEIDLECK, Primary Examiner

U.S. Cl. X.R.

260—561